United States Patent [19]

Schmidberger et al.

[11] Patent Number: 4,981,511

[45] Date of Patent: Jan. 1, 1991

[54] COMPOUND OR COMPOSITE POWDER WITH METALLIC OR CERAMIC WHISKERS

[75] Inventors: Rainer Schmidberger; Tilman Haug, both of Markdorf; Reinhard Marquardt, Friedrichshafen; Juergen Bocan, Berlin, all of Fed. Rep. of Germany

[73] Assignee: Dornier System GmbH, Friedrichshafen, Fed. Rep. of Germany

[21] Appl. No.: 194,500

[22] Filed: May 16, 1988

[30] Foreign Application Priority Data

May 15, 1987 [DE] Fed. Rep. of Germany ....... 3716330

[51] Int. Cl.$^5$ ............................................... B22F 3/00
[52] U.S. Cl. ..................................... 75/229; 428/570; 75/236; 75/235; 75/244; 75/252; 75/255; 501/88; 501/95; 501/96; 501/103; 501/127
[58] Field of Search ................. 75/229, 230, 232, 233, 75/234, 235, 236, 244, 245; 428/570, 544, 545, 567, 364, 367, 380, 381, 384; 501/88, 95, 89, 96, 103; 264/60, 65

[56] References Cited

U.S. PATENT DOCUMENTS 4,808,485  2/1989  Prewo et al. ......................... 428/582
4,820,663  4/1989  Mehrotra et al. ..................... 501/87

Primary Examiner—Stephen J. Lechert, Jr.
Assistant Examiner—N. Bhat
Attorney, Agent, or Firm—Ralf H. Siegemund

[57] ABSTRACT

A compound or composite powder which includes metallic or ceramic whiskers embedded in a metallic or ceramic matrix as host material, the whiskers have a length between $5\times10^{-6}$ m and $2\times10^{-4}$ m and diameters between $2\times10^{-7}$ m and $1\times10^{-5}$ m, and are embedded in the matrix with a volume proportion of whisker content between 1 to 50% (by volume), the reference being to a pore-free compacted compound/composite material; the whiskers being made of SiC, $Si_3N_4$, $Al_2O_3$ or $ZrO_2$ and are embedded in a ceramic matrix being $Al_2O_3$, $Al_2O_3$+from 5 to 40% $ZrO_2$+from 0 to 5% $Y_2O_3$ or $ZrO_2$ with 3 to 15% $Y_2O_3$ or Si-nitride or Si-carbide. Alternatively the whiskers are made of $Si_3N_4$, $Al_2O_3$, $ZrO_2$ or W and the matrix is made of W, Mo, Fe, Ni, Co, Cu or an alloy thereof.

4 Claims, 1 Drawing Sheet

COMPOUND OR COMPOSITE POWDER WITH METALLIC OR CERAMIC WHISKERS

BACKGROUND OF THE INVENTION

The present invention relates to a compound powder or composite whose particles are comprised of ceramic or metallic whiskers, thinly embedded in a host or matrix material, the powder being provided ultimately for the manufacture of construction parts which are expected to undergo significant wear.

The term whiskers is going to be used throughout and includes extremely thin fibers within conventional meaning as well as very thin poly-crystalline fibers of relatively short dimensions which may have some deteriorated mechanical properties, as poly-crystals themselves have, but are, for some reason or another, more easily to be manufactured. Generally speaking, with increasing relative proportions of the whisker content in an embedding matrix, it is more and more difficult to obtain a homogenic distribution of the whiskers within the matrix, if the usual, known, powder metallurgical methods and steps of making such a product are used. In cases, actually, it may become impossible to provide a reasonably homogeneous distribution of the whiskers.

In the case of fiber re-inforced compound material, the inclusion and embedment of homogeneously distributed whiskers, produce a modified pattern in the formation of cracks or ruptures, such as crack deflection, crack splitting, whisker delamination or whisker breakage. Macorscopically, this amounts to a significant increase in ductility ($k_i$ factor). A concurrent improvement in strength depends to a considerable extent on the chosen composition of the material and here particularly the combination with a whisker embedding matrix. A limiting factor here is internal tension that is produced for one reason or another. Ductility has to be improved as well as the strength, and that depends basically, and again from a macroscopic point of view, on the volume fraction (ratio) of the whisker content. It can, therefore, be explicated through the following relation, which is, at least, approximately true:

$$\sigma_c = x_\mu + x_w \sigma_{c_w}$$

$$K_c = x_\mu k_{c\mu} + x_w k_{c_w}$$

Contrary to poly-crystalline fibers which are quite widely used in the production of compound or composite material, and particularly of a ceramic and metallic nature, the whiskers have a significantly higher strength. Normally, it can be expected that these whiskers have a strength which is the eight to ten-fold strength value of poly-crystalline fibers. With this particular property, of course, has great significance for the compound material.

The effect of the previously mentioned mechanism for enhancing and increasing ductility and strength, depends to a considerable extent on the degree of homogeneity as far as the spatially or volume distribution of the whiskers in the embedding matrix is concerned. Areas with the significantly increased whisker content can be interpreted as macro defects and are, in fact, even at relatively low loads, prone to trigger component fracture.

Conventionally, whiskers are included in the making of powder by superimposing certain steps upon the powder metallurgical steps generally. First, the whiskers are cleaned in acetone, and then they are de-agglomerated with ultra-sound within n-Hexane alcohol or water. It has also been suggested to treat the whiskers, in addition, with a tumbling blender. Subsequently, ball grinding is used to mix whiskers with a powder matrix material. It is inevitable that under such circumstances whiskers brake. The fractured pieces will normally have rather sharp edges and will, in fact, subsequently, lead to significantly high local concentration and tension within the embedding matrix. On the other hand, a homogenous distribution of the whiskers becomes more and more difficult, the higher the proportion in whiskers, if the known techniques are used.

DESCRIPTION OF THE INVENTION

It is an object of the present invention to improve ductility, tensile strength, and related mechanical properties of ceramic and/or powder-metallurgically made, compound or composite materials through an improvement in the manufacture of the powder.

In accordance with the preferred embodiment of the present invention, it is suggested to provide whiskers in the length between $5 \times 10^{-6}$ m and $2 \times 10^{-4}$ m at diameters between $2 \times 10^{-7}$ and $1 \times 10^{-5}$ m, and to embed these whiskers in metal or ceramic at a volume ratio with at least 1% whiskers up to about 50% in proportion to the pore-free, condensed (compacted) compound product that is being produced.

The invention offers the possibility to, indeed, provide a homogenic distribution of the whiskers within the embedding matrix, even if the content of whiskers is as high as 50%. There will be no fractures of the whiskers in the powder so that a pre-requisite is given for providing optimum texture of whisker re-inforced materials.

In accordance with the invention, powder particles containing metallic and/or ceramic whisker can be provided by the inventive method; a homogenic distribution of the whiskers is ensured. The homogeneous distribution of the whiskers as well as a very high specific surface of powder made in accordance with a reaction spray method, effects directly any sintering that may be provided for subsequently. The powder making has also a bearing on the shaping of parts to be made. Depending upon a pre-treatment of one kind or another, one may obtain a particular orientation of the whiskers within the compound element. Known process methods are applicable here, are, for example, foil casting, schlicker casting, hot or cold extrusion, all can be used for working the powder of the consistency as stated. This working includes the making of thick as well as thin wall parts, and it even includes form parts with a high porosity. Their mechanical properties are improved by the invention which remains even at extremely high temperatures.

DESCRIPTION OF THE DRAWINGS

While the specification concludes with claims particularly pointing out and distinctly claiming the subject matter which is regarded as the invention, it is believed that the invention, the objects and features of the invention, and further objects, features and advantages thereof will be better understood from the following description taken in connection with the accompanying drawings in which:

Figure 1:
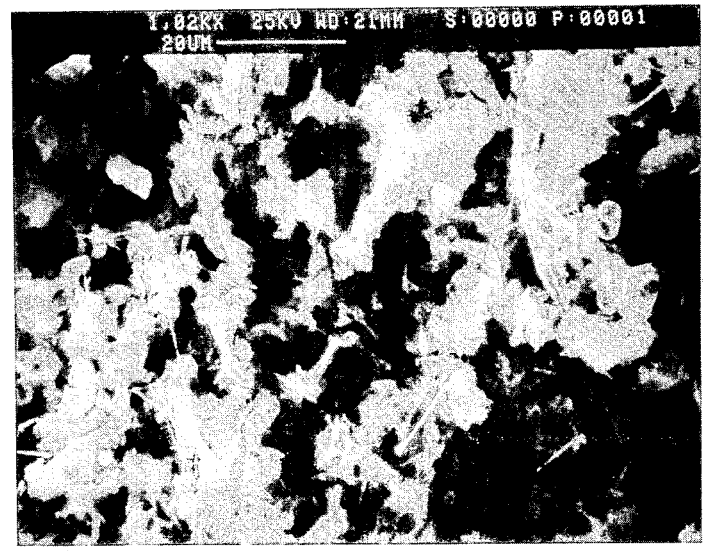
FIG. 1 illustrates a powder of a ceramic nature incorporating the invention for embedding whiskers but there was no further treatment.
Figure 2:
FIG. 2 illustrates the fracture surface of a porous, sintered ceramic part with embedded whiskers in accordance with the invention.

A powder in accordance with the invention, is made as follows: Involved is particularly a ceramic matrix with whiskers made of SiC, $Si_3N_4$, $Al_2O_3$ or $ZrO_2$. The oxide ceramic may be $Al_2O_3$, $Al_2O_3+5$ to 40% $ArO_2+0$ up to 5% $Y_2O_3$ or $ZrO_2$ with 3 to 15% $Y_2O_3$ or Si-Nitride or Si-Carbide. The whiskers may also be made of $Si_3N_4$, $Al_2O_3$, $ZrO_2$ or W with an embedding matrix of W, Mo, Fe, Ni, Co, Cu or any of their alloys.

Whiskers, as made and being comprised of one of the material, as stated, produce, as expected, a certain agglomeration, other impurities may occur. This, in turn, makes it necessary to provide for a pre-treatment of the whiskers. Here then, primarily, one will remove descrete foreign particles. The whiskers themselves will be suspended and de-agglomerated in acetone or alcohol under utilization of a turbo stirrer or through ultrasound. Such foreign particles then will sediment rather quickly and can easily be decanted. The whiskers may be coated with metal or by a ceramic.

The excess suspension, or residuel suspension, is then removed from the solvant through filtration. The whiskers will be received by water and are newly suspended by means of turbo stirring or through ultra-sonic application. The homogeneous distribution of whiskers can be enhanced, if necessary, by adding the usual adjusting materials, such as poly-alcohols or the like.

Salts or salt solutions are then to be stirred into the suspension. These salts or salt solutions will later provided cations for the formation of metallic or ceramic matrises. The adjusting establishes the desired concentration as well as the desired matrix to whisker volume relationship.

The resulting suspension is continuously stirred in a suspension supply vessel, while being sprayed into a hot reactor. Moreover, the metal on which the oxide ceramic of the embedding host is based, is sprayed into the hot reactor, together with the suspended whiskers and at the stoichiometrically correct ratio. Alternatively, a metal salt, whisker suspension is sprayed into a hot reactor, being operated in a reducing atmosphere.

The spraying of such a suspension combines a number of very advantageous phenomena for the compound material. First of all, the resulting powder will have a very fine grain, and the whiskers are distributed in the powder very homogeneously, while, in addition, the components of the matrix in which the whiskers are embedded, are likewise homogeneously distributed.

Through-put and composition of the suspension, as well as the type of nozzle used, be it a two-component nozzle, a CSL nozzle, or the like, also depends upon the temperature in the reactor and the dwell or residence time therein, establish a variety of parameters which can be adjusted so that the product qualities and properties are controlled. This, in turn, results in an added control of the homogeneity of the suspension, and it follows from the fact that the matrix parts can be used in the form of a solution or even in the case of a homogeneous suspension.

As stated, the volumes of the whiskers can be as low as 1% but up to about 50% can be used, in relation to a pore-free compacted compound material. It is quite clear that in the case of a porous matrix the apparent relative content in whiskers is still high on account of that porosity.

EXAMPLE 1

Solution manufacture of ceramic. 72 grams of Sg SiC-whiskers are pre-treated in a manner as described above and conditioned. The whiskers are suspended, for example, in 2 liter of water, and, depending on these proportions, 2,354 g $AlCl_3\cdot6H_2O$ are added. This solution is then watered down to 4 liter, and sprayed into a reactor, being heated to about 1,100°C. As a consequence, one obtains an aluminum oxide powder in which, within the constraint indicated above, SiC-whiskers occupy 15 vol%.

EXAMPLE 2

Solution manufacture of a heavy metal. 10 grams $Si_3N_4$ whiskers are pre-treated as described, but now an ammonium-meta tungstenate is added, as well as nickel nitrate and cobalt nitrate in a watery suspension, being comprised of a genuine solution of tungsten, nickel and cobalt, wherein the whiskers are the suspended in a sludge.

They contain about 900 g tungsten, 70 g nickel, and 30 g cobalt in a 2.5 l suspension in terms of volume. Following spraying in a reactor that has been heated to 1,100° C. and is flash with hydrogen, one obtains a tungsten-based heavy metal powder with 6-vol% of $Si_3N_4$-whiskers included.

The invention is not limited to the embodiments described above, but all changes and modifications thereof, not constituting departures from the spirit and scope of the invention are intended to be included.

We claim:

1. Compound or composite powder having particles, the powder as to each particle comprising metallic or ceramic whiskers embedded in a metallic or ceramic matrix; (host material); and said whiskers having a length between $5 \times 10^{-6}$ m and $2 \times 10^{-4}$ m and diameters between $2 \times 10^{-7}$ m and $1 \times 10^{-5}$ m, being embedded in the matrix with a volume proportion of whisker content between 1 and 50% (by volume), the reference being to a pore-free compacted compound/composite powder material as regards the uncompressed powder particles.

2. Compound powder as in claim 1, said whiskers being made of SiC, $Si_3N_4$, $Al_2O_3$ or $ZrO_2$ embedded in a ceramic matrix.

3. Compound powder as in claim 2, said ceramic being $Al_2O_3$, $Al_2O_3$ + from 5 to 40% $ZrO_2$ +from 0 to 5% $Y_2O_3$ or $ZrO_2$ with 3 to 15% $Y_2O_3$ or Si-nitride or Si-carbide.

4. Compound powder as in claim 1, said whiskers being individually coated by a metal or ceramic.

* * * * *